United States Patent
Bains

(10) Patent No.: US 7,644,344 B2
(45) Date of Patent: Jan. 5, 2010

(54) LATENCY BY OFFSETTING CYCLIC REDUNDANCY CODE LANES FROM DATA LANES

(75) Inventor: Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 11/803,734

(22) Filed: May 15, 2007

(65) Prior Publication Data

US 2008/0288848 A1 Nov. 20, 2008

(51) Int. Cl.
*H03M 13/00* (2006.01)

(52) U.S. Cl. .......... 714/781; 714/48; 714/758; 714/799

(58) Field of Classification Search .......... 714/48, 714/758, 781, 799
See application file for complete search history.

(56) References Cited

U.S. PATENT DOCUMENTS

| | | | | |
|---|---|---|---|---|
| 5,638,518 A | * | 6/1997 | Malladi | 709/251 |
| 5,844,923 A | * | 12/1998 | Condon | 714/798 |
| 6,829,315 B1 | * | 12/2004 | Cruikshank | 375/354 |
| 6,950,632 B1 | * | 9/2005 | Yun et al. | 455/69 |
| 7,076,004 B2 | * | 7/2006 | Kim et al. | 375/340 |
| 7,310,757 B2 | * | 12/2007 | Ngo et al. | 714/725 |
| 2005/0108611 A1 | | 5/2005 | Vogt | |
| 2007/0055796 A1 | | 3/2007 | Choi | |

FOREIGN PATENT DOCUMENTS

WO  WO 2007/054808  5/2007

OTHER PUBLICATIONS

International Search Report for corresponding matter P25917GB dated Sep. 9, 2008.

* cited by examiner

*Primary Examiner*—Esaw T Abraham
(74) *Attorney, Agent, or Firm*—Blakely, Sokoloff, Taylor & Zafman LLP

(57) ABSTRACT

Embodiments of the invention are generally directed to systems, methods, and apparatuses for improving latency by offsetting cyclic redundancy check lanes from data. In some embodiments, a memory device includes a memory array to provide read data bits and a cyclic redundancy code (CRC) generator to generate CRC bits corresponding to the read data bits. In addition, the memory device may include a transmit framing unit to transmit the read data bits and the CRC bits to a host, wherein the transmit framing unit includes logic to offset the transmission of the CRC bits from the transmission of the read data bits based, at least in part, on an offset value. Other embodiments are described and claimed.

6 Claims, 7 Drawing Sheets

US 7,644,344 B2

LATENCY BY OFFSETTING CYCLIC REDUNDANCY CODE LANES FROM DATA LANES

TECHNICAL FIELD

Embodiments of the invention generally relate to the field of integrated circuits and, more particularly, to systems, methods and apparatuses for improving latency by offsetting cyclic redundancy code lanes from data lanes.

BACKGROUND

The transfer rates used on dynamic random access memory (DRAM) channels continue to increase. The faster transfer rates increases the likelihood of transmission errors on the DRAM channel. Some conventional systems use cyclic redundancy codes (CRC) to provide error protection for data transmitted on the DRAM channel. The generation and incorporation of CRC bits into a frame increases the DRAM read latency. Additional latency is incurred on the host side by regenerating the CRC checksum to validate the read data.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for improving latency by offsetting cyclic redundancy code lanes from data. In some embodiments, a memory device includes a memory array to provide read data bits and a cyclic redundancy code (CRC) generator to generate CRC bits corresponding to the read data bits. In addition, the memory device may include a transmit framing unit to transmit the read data bits and the CRC bits to a host. As is further discussed below with reference to FIGS. 1-7, in some embodiments, the transmit framing unit includes logic to offset the transmission of the CRC bits from the transmission of the read data bits based, at least in part, on an offset value.

Figure 1:
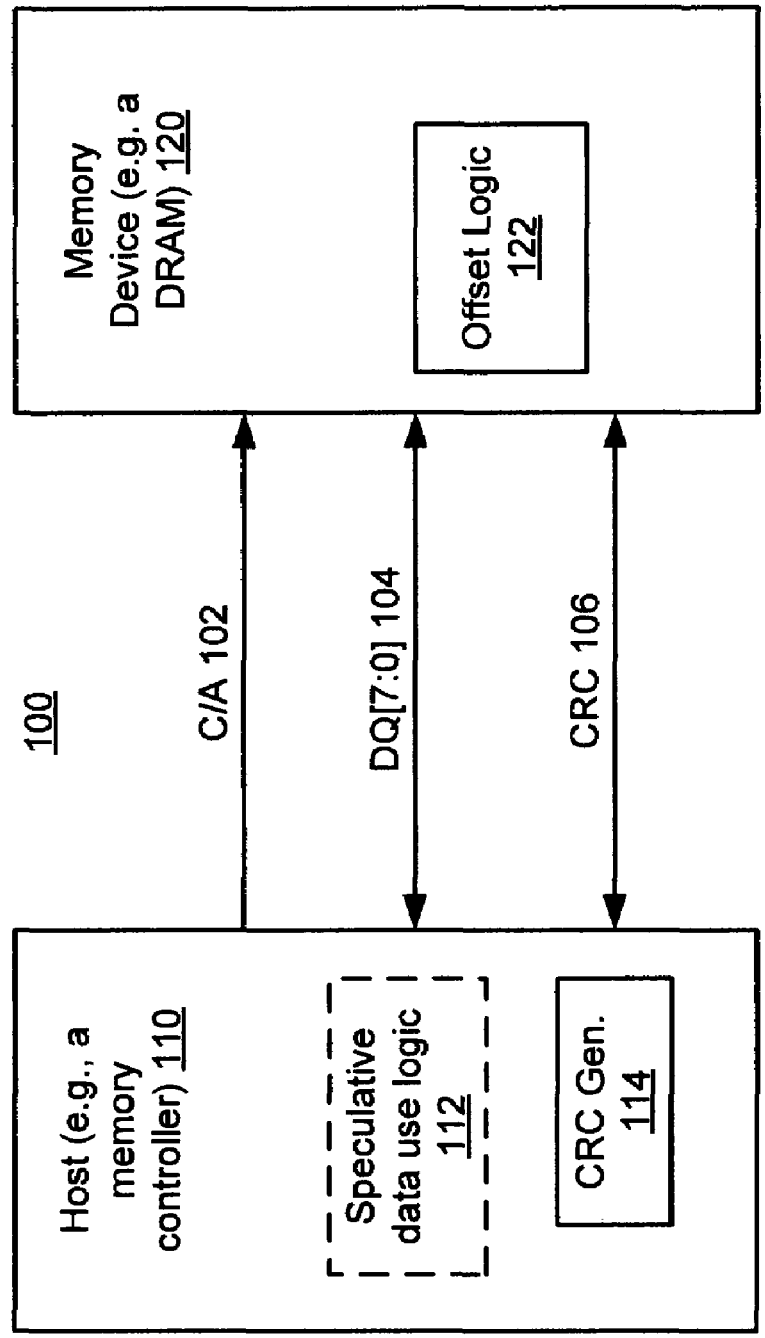
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. In the illustrated embodiment, system 100 includes host 110 (e.g., a memory controller) and memory device 120 (e.g., a DRAM). In alternative embodiments, system 100 may include more elements, fewer elements, and/or different elements.

Memory device 120 includes offset logic 122. In some embodiments, offset logic 122 enables memory device 120 to offset the transmission of CRC bits from read (RD) data bits. For example, in some embodiments, memory device 120 starts the transmission of a RD data frame before the CRC checksum is generated. This enables memory device 120 to reduce the latency incurred due to generating a CRC checksum.

In some embodiments, the transmission of the CRC bits is offset from the transmission of the data bits based, at least in part, on an offset value. In some embodiments, the offset value is fixed (e.g., ½ frame, ¾ frame, etc). In such embodiments, the offset value may be determined by the length of time required to generate the CRC checksum (e.g., the CRC latency). In alternative embodiments, the offset value is programmable. Offset logic 122 is further described below with reference to FIG. 2.

Command/Address (C/A) lanes 102 provide a plurality of lanes for sending commands and addresses to memory device 120. DQ lanes 104 provide a bi-directional read/write data bus. CRC lanes 106 provide a bi-directional bus to transfer CRC checksum bits. In alternative embodiments, DQ lanes 104 and/or CRC lanes 106 may be unidirectional. For ease of description, embodiments of the invention are described with reference to a ×8 memory device. It is to be appreciated, however, that embodiments of the invention may include other device data widths such as ×4, ×16, ×32, etc.

Host 110 controls the transfer of data to and from memory device 120. In some embodiments, host 110 is integrated onto the same die as one or more processors. Host 110 includes CRC generator 114. CRC generator 114 generates a local CRC that can be compared with a CRC checksum from memory device 120 to determine whether transmitted data has been corrupted. As is further described, in some embodiments, CRC generator 114 initiates the generation of a local CRC checksum prior to receiving a CRC checksum from memory device 120. Since host 110 can generate a local CRC checksum before receiving the remotely generated CRC checksum, it reduces the latency incurred by generating and comparing CRC checksums.

In some embodiments, host 110 may also include logic 112 which speculatively uses data received from memory device 120 before the CRC checksums have been compared. In such embodiments, the speculative use of data prior to the CRC checksum comparison further reduces the latency incurred due to CRC comparisons. Speculative use of data is further discussed below with reference to FIG. 3.

Figure 2:
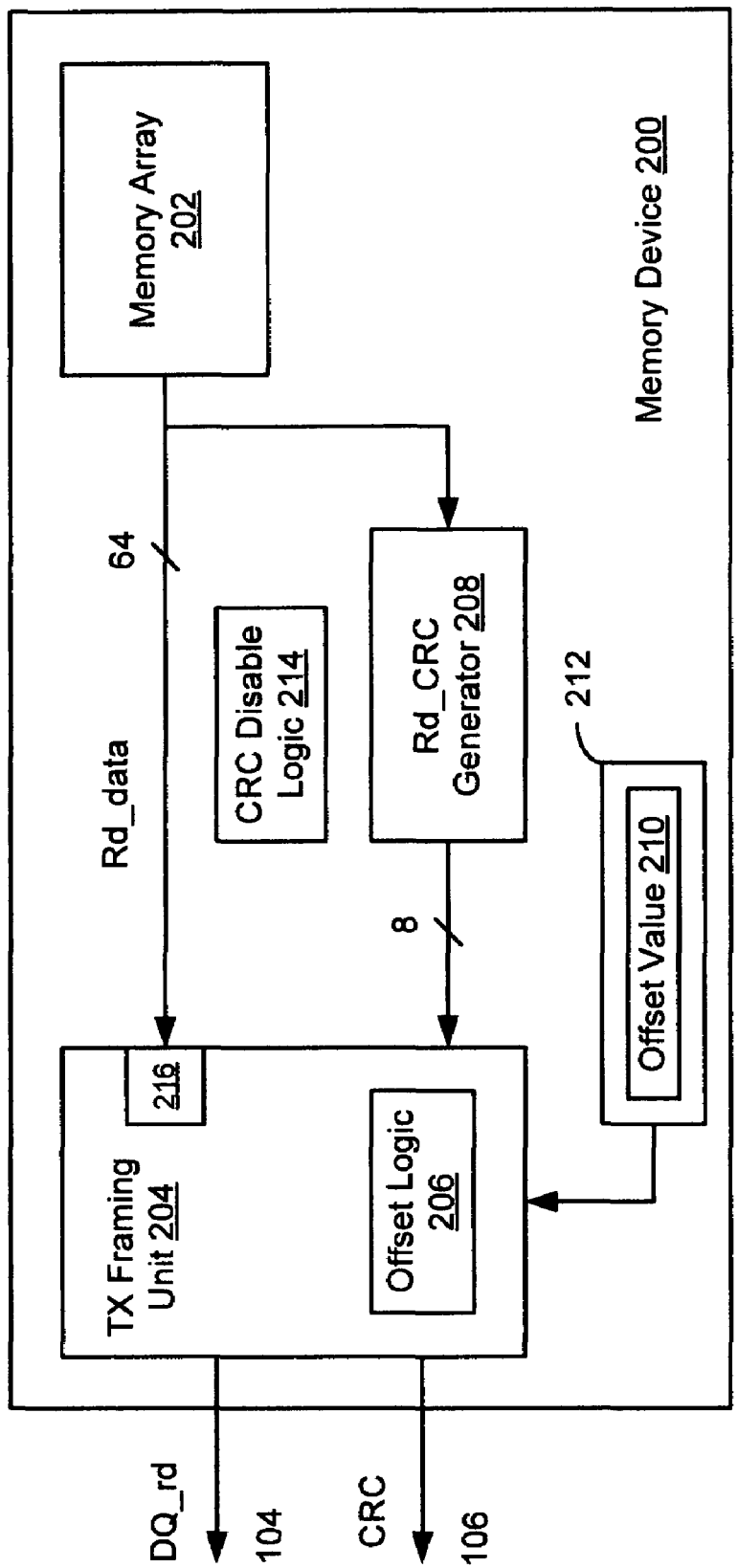
FIG. 2 is a block diagram illustrating selected aspects of a memory device implemented according to an embodiment of the invention.

FIG. 2 is a block diagram illustrating selected aspects of a memory device implemented according to an embodiment of the invention. Memory device 200 includes, inter alia, memory array 202, transmit (TX) framing unit 204, and CRC generator 208. In alternative embodiments, memory device 200 may include more elements, fewer elements, and/or different elements. In some embodiments, memory device 200 is a dynamic random access memory device (DRAM).

In operation, memory device 200 receives a RD command from the host (e.g., host 110) on a C/A bus (e.g., C/A bus 102). The data is read from memory array 202 and provided to TX framing unit 204. The read data is also provided to CRC generator 208 which computes a CRC checksum. In some embodiments, six levels of XOR trees are used to compute the CRC checksum. In alternative embodiments, a different number of XOR trees or a different algorithm may be used to generate the CRC checksum. The compute time for the CRC checksum may be defined as CRC_latency. In some embodiments, the CRC_latency is in the order of 1.25 nanoseconds. In some embodiments, the RD data is 64 bits in length and the CRC checksum is 8 bits length. It is to be appreciated, however, that in alternative embodiments the lengths of the RD data and/or the CRC checksum may be different.

TX framing unit 204 creates the data frame that is delivered to the host on the DQ and CRC lanes (e.g., DQ lanes 104 and CRC lanes 106). In some embodiments, TX framing unit 204 includes offset logic 206. Offset logic 206 offsets (e.g., delays) the transfer of CRC bits in relation to the RD data bits based, at least in part, on an offset value 210. Thus, in some embodiments of the invention, the RD data bits are transferred as soon as they are available to TX framing unit 204 and they are not stalled to wait for the CRC bits from CRC generator 208. In some embodiments, the RD data bits are transferred at a latency that is comparable to the latency incurred by a memory device that does not implement CRC.

Offset value 210 may be selected so that the CRC bits are offset by an amount substantially equal to the CRC_latency. In some embodiments, offset value 210 is a fixed value that is hard coded into memory device 200. In such embodiments, offset value 210 may be a fraction of the size of the RD data frame (e.g., ½ frame, ⅓ frame, ¾ frame, etc.).

In alternative embodiments, offset value 210 is programmable. For example, offset value 210 may be programmed into a register (e.g., register 212) on memory device 200. In some embodiments, the basic input/output system (BIOS) sets offset value 210. In alternative embodiments, a training sequence may be used to determine and set offset value 210.

Memory device 200 includes CRC disable logic 214. In some embodiments, CRC disable logic 214 disables the use of a CRC by memory device 200. Thus, in some embodiments, memory device 200 can be configured to use a CRC checksum with RD data or configured to not use a CRC checksum with RD data.

Figure 3:
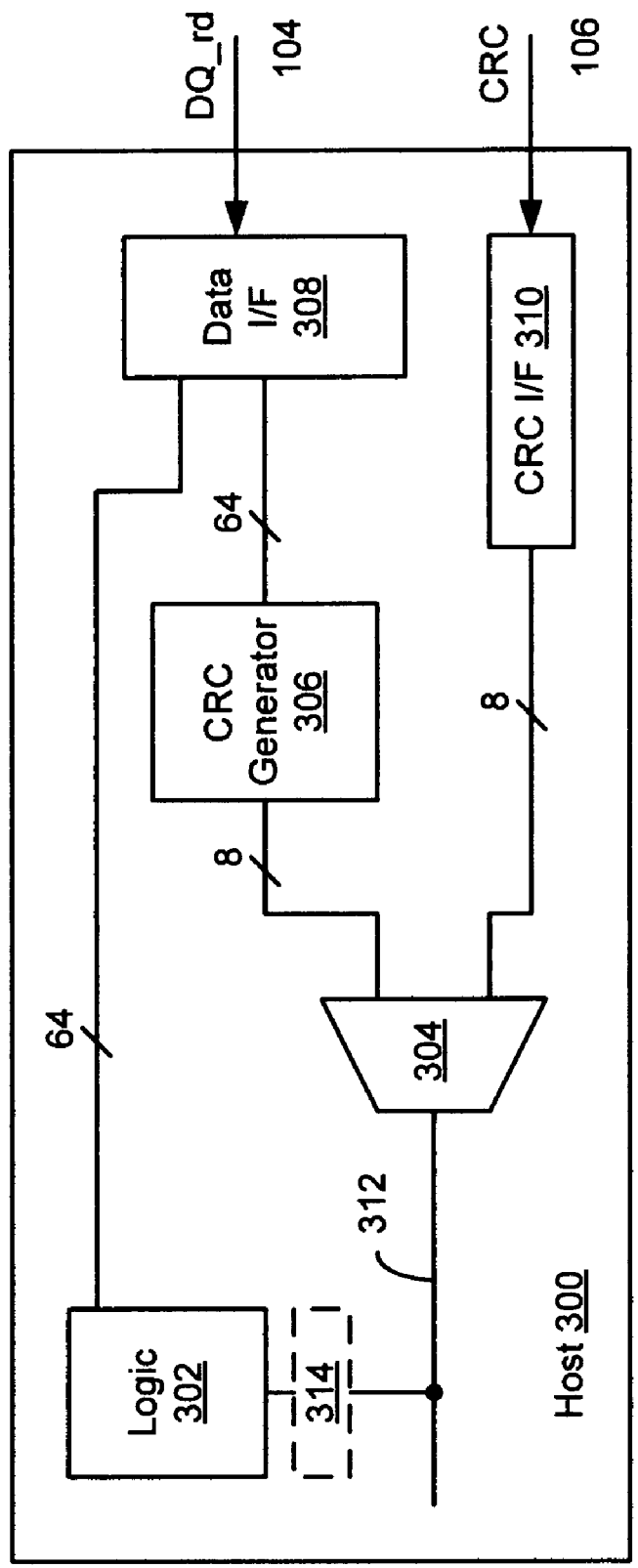
FIG. 3 is a block diagram illustrating selected aspects of a host implemented according to an embodiment of the invention.

FIG. 3 is a block diagram illustrating selected aspects of a host implemented according to an embodiment of the invention. Host 300 includes, inter alia, data interface (I/F) 308, CRC I/F 310, CRC generator 306, comparator 304, and logic 302. In alternative embodiments, host 300 includes more elements, fewer elements, and/or different elements. Data interface 308 provides an interface between host 300 and DQ lanes 104. Similarly CRC interface 310 provides an interface between host 300 and CRC lanes 106. Interfaces 308 and 310 may include a number of drivers, receivers, clocking circuits, and the like.

In operation, RD data arrives at host 300 over DQ lanes 104. CRC generator 306 receives the RD data and computes a "local" CRC checksum. The term "local" is used to distinguish between the CRC checksum generated by the host and the CRC checksum generated by the memory device. The CRC bits arrive on CRC lane 106 which are different lanes than DQ lanes 104.

Comparator 304 compares the local CRC checksum (e.g., from CRC generator 306) with the CRC checksum received from the memory device. If they match, then output 312 indicates that the data is valid. If they do not match, then output 312 may provide an error signal.

In some embodiments, host 300 includes logic 314. Logic 314 enables host 300 to speculatively use the RD data prior to comparing the local CRC with the CRC received from the memory device. In such embodiments, if a CRC error occurs, then logic 314 may abort the usage of the RD data and attempt to recover a previous state.

Figure 4:
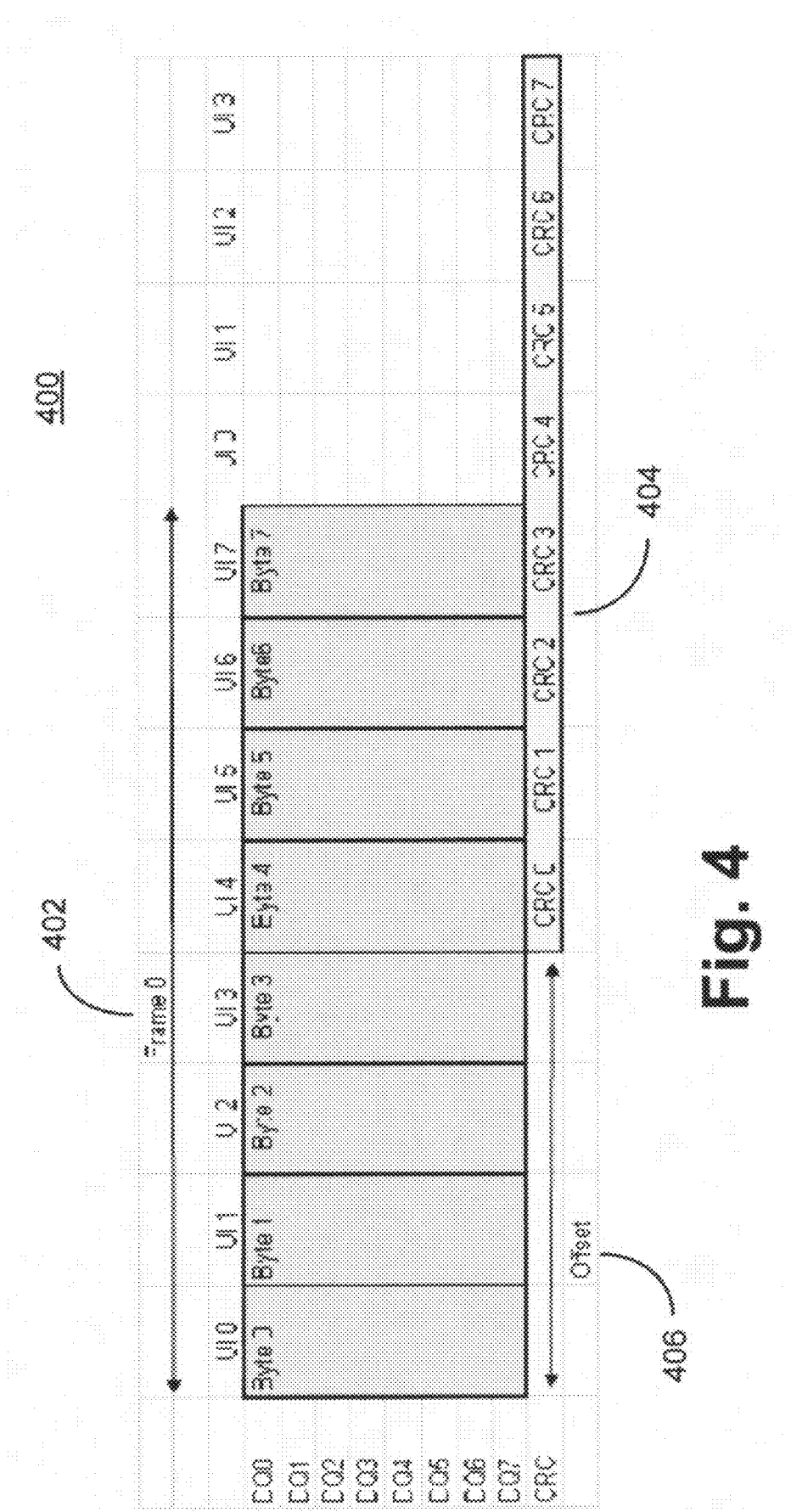
FIG. 4 illustrates selected aspects of a read data frame format and corresponding offset CRC bits, implemented according to an embodiment of the invention.

FIG. 4 illustrates selected aspects of a RD data frame format implemented according to an embodiment of the invention. As shown in FIG. 4, RD data frame 402 includes eight bytes of data transferred over user intervals zero to seven. In some embodiments, a TX framing unit (e.g., TX framing unit 204, shown in FIG. 2) transfers RD data frame 402 as soon as it is available. The CRC bits (404), however, are transferred after an offset 406 transpires. In the illustrated embodiment, the offset is 4 UI or one half of the width of the frame. In alternative embodiments, the offset may be less or more.

Figure 5:
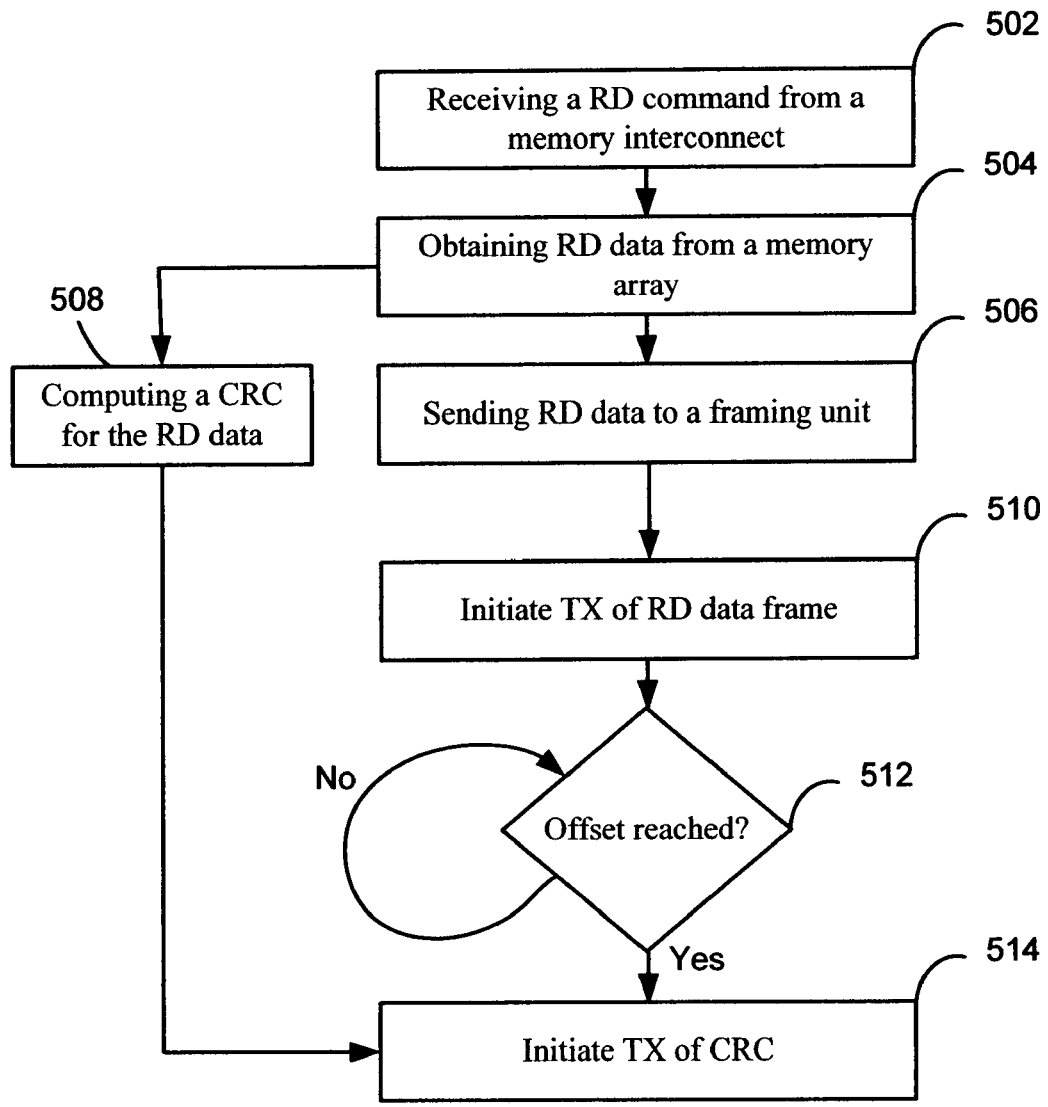
FIG. 5 is a flow diagram illustrating selected aspects of a method for offsetting a CRC lane from the data lanes according to an embodiment of the invention.

FIG. 5 is a flow diagram illustrating selected aspects of a method for offsetting a CRC lane from the data lanes according to an embodiment of the invention. Referring to process block 502, a memory device (e.g., memory device 200, shown in FIG. 2) receives a RD command from a memory interconnect (e.g., from C/A bus 102, shown in FIG. 1). The memory device obtains the appropriate RD data from its memory array at 504 and sends the RD data to a framing unit at 506 (e.g., to TX framing unit 204). The RD data may also be sent to a CRC generator (e.g., CRC generator 208, if CRC is enabled) at (substantially) the same time that it is sent to the framing unit (508).

Referring to process block 510, the framing unit transfers the RD data to the host as soon as it is available without waiting for the corresponding CRC bits to be generated. In some embodiments, the framing unit delays sending the CRC bits until an offset is reached (512). The offset may be comparable in length to the CRC_latency so that the framing unit transfers the CRC bits soon (or immediately) after they are available. In some embodiments, the offset is a fixed amount. In alternative embodiments, the offset is programmable. The framing unit initiates the transfer of the CRC bits at 514.

Figure 6:
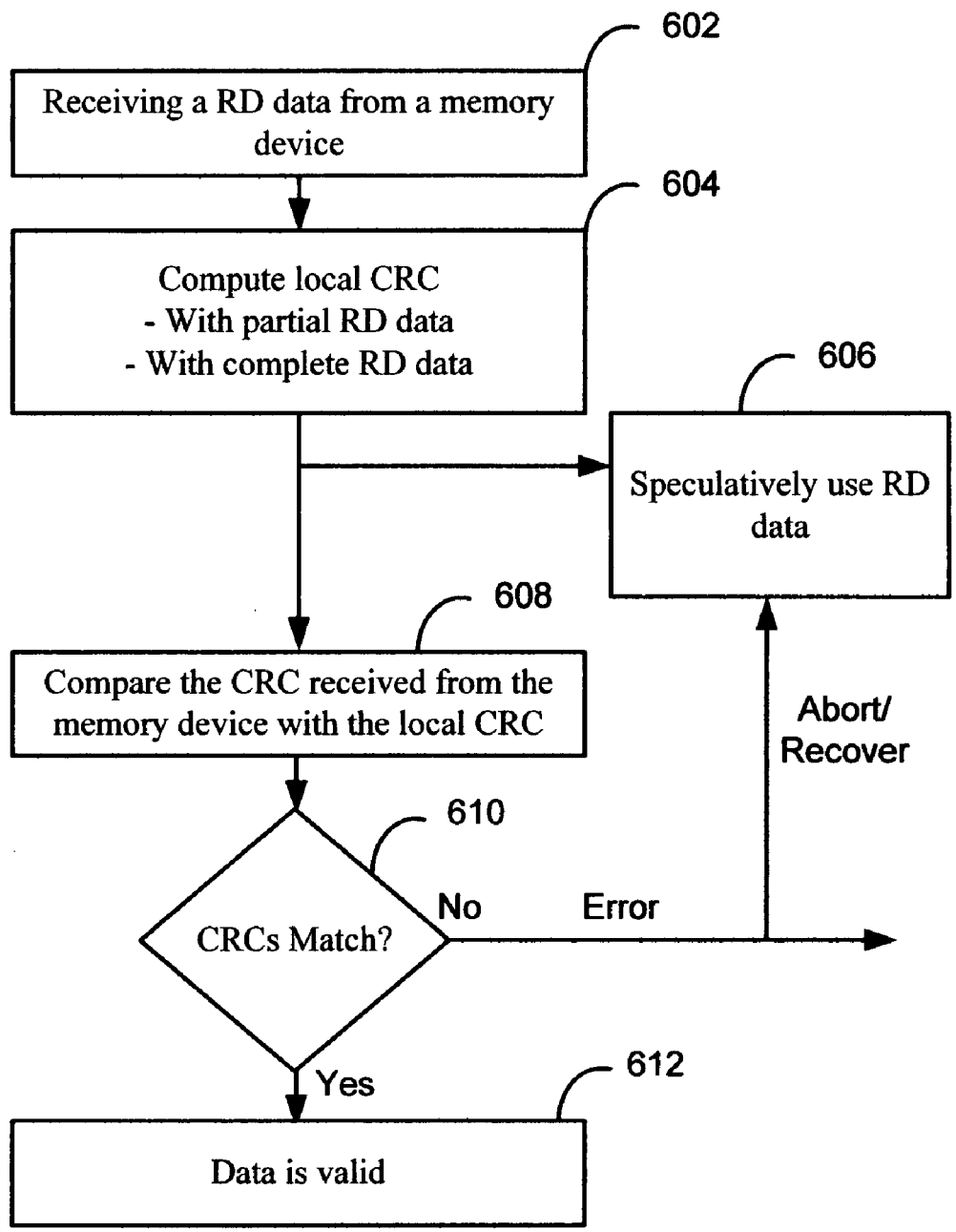
FIG. 6 is a flow diagram illustrating selected aspects of a method for reducing latency in a host based on an offset CRC lane according to an embodiment of the invention.

FIG. 6 is a flow diagram illustrating selected aspects of a method for reducing latency in a host based on an offset CRC lane according to an embodiment of the invention. Referring to process block 602, the host receives RD data from the memory device (e.g., via DQ lanes 104, shown in FIG. 1). In some embodiments, the host starts to compute the local CRC checksum prior to receiving all of the RD data from the memory device (e.g., prior to receiving all of frame 402, shown in FIG. 4). In alternative embodiments, the host starts to compute the local CRC after the completion of the transfer of the RD data (e.g., after frame 402 is transferred). In some embodiments, the host includes logic to speculatively use the RD data before the CRC check is complete (406).

The host compares the CRC received from the memory device with the local CRC at 608. If they match, then the data is considered valid as shown by 612. If they do not match, then an error signal may be generated. If the host is speculatively using the RD data and the CRCs do not match, then the use of the data may be aborted and the host may attempt to recover its state.

Figure 7:
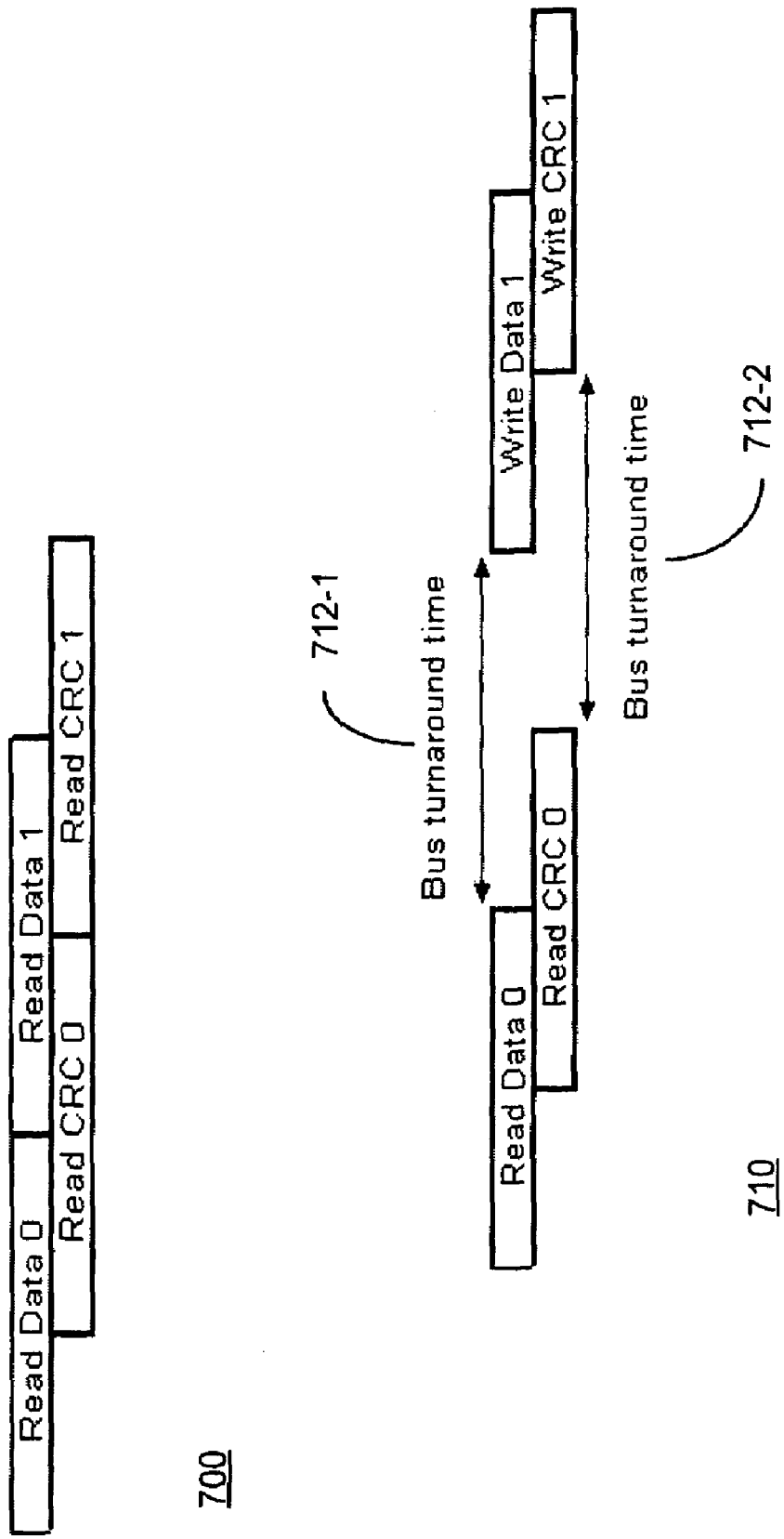
FIG. 7 illustrates selected aspects of optimizing bus turn-around cycles according to an embodiment of the invention.

FIG. 7 illustrates selected aspects of optimizing bus turnaround cycles according to an embodiment of the invention. Transaction 700 illustrates an example of back-to-back reads from a memory device (e.g., a DRAM) with seamless transfers. For example, RD data frame 1 is sent immediately after RD data frame 0. Since the CRC bits are transferred on a different lane, CRC 0 and CRC 1 can each be delayed by an offset without interfering with the transfer of a RD data frame.

Transaction 710 illustrates an example of a write (WR) data frame being transferred subsequent to the transfer of a RD data frame. In some embodiments, after the transfer of RD data frame 0, there is a delay of "bus turnaround time" 712-1 before transferring WR data frame 1. Similarly, after the transfer of RD CRC 0, there is a delay of "bus turnaround time" 712-2 before transferring WR CRC 1. The reason for delaying the transfer of WR data frame 1 (and write CRC 1) by bus turn around time 712 is to allow for the signals to settle on the bus when switching between read transfers and write transfers.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A system comprising:
    a memory device including,
        a memory array to provide read data bits responsive to a read command,
        a cyclic redundancy code (CRC) generator to generate remotely generated CRC bits corresponding to the read data bits provided by the memory array, and
        a transmit framing unit to transmit the read data bits and the remotely generated CRC bits to a host, wherein the transmit framing unit includes logic to offset the transmission of the remotely generated CRC bits from the transmission of the read data bits based, at least in part, on an offset value; and
    the host, wherein the host includes
        an interface circuit to receive the read data bits from the memory device,
        a cyclic redundancy code (CRC) generator coupled with the interface circuit to generate local CRC bits based, at least in part, on the read data bits,
        another interface circuit to receive the remotely generated CRC bits from the memory device, wherein the remotely generated CRC bits cover the read data bits, and
        a comparator coupled with the CRC generator and the other interface circuit, the comparator to compare the local CRC bits with the remotely generated CRC bits, wherein the CRC generator is to start generating the local CRC bits before receiving the remotely generated CRC bits.

2. The system of claim 1, wherein the offset value is a fixed offset value.

3. The system of claim 1, wherein the fixed offset value is a one-half frame offset.

4. The system of claim 1, wherein the offset value is a programmable offset value.

5. The system of claim 1, wherein the host further comprises:
    logic to speculatively operate on the read data bits prior to comparing the local CRC bits with the remotely generated CRC bits.

6. The system of claim 5, wherein the host comprises a memory controller.

* * * * *